United States Patent [19]
Fermann et al.

[11] Patent Number: 5,880,877
[45] Date of Patent: Mar. 9, 1999

[54] APPARATUS AND METHOD FOR THE GENERATION OF HIGH-POWER FEMTOSECOND PULSES FROM A FIBER AMPLIFIER

[75] Inventors: Martin E. Fermann; Almantas Galvanauskas; Donald J. Harter, all of Ann Arbor, Mich.

[73] Assignee: Imra America, Inc., Ann Arbor, Mich.

[21] Appl. No.: 789,995

[22] Filed: Jan. 28, 1997

[51] Int. Cl.$^6$ ................................ H01S 3/00; H01S 3/10
[52] U.S. Cl. ............................ 359/341; 372/21; 372/22; 372/6
[58] Field of Search .................................... 359/184, 341, 359/346, 347; 372/21, 22, 6

[56] References Cited

U.S. PATENT DOCUMENTS

| Re. 35,215 | 4/1996 | Waarts et al. ........................... 372/108 |
| 4,829,529 | 5/1989 | Kafka . |
| 4,913,520 | 4/1990 | Kafka . |
| 5,303,314 | 4/1994 | Duling, III et al. . |
| 5,499,134 | 3/1996 | Galvanauskas et al. . |
| 5,530,582 | 6/1996 | Clark . |
| 5,583,959 | 12/1996 | Nakazawa et al. ........................ 385/27 |

OTHER PUBLICATIONS

"I.11 Diode Pumped Fiber Lasers for high Output Powers and femtosecond Pulses", *leischin@mbi–berline.de*, Oct. 1997.

Alexandrite–Pumped Alexandrite Regenerative Amplifier for Femtosecond Pulse Amplification, A. Hariharan et al, Optical Society of America, 1996, pp. 128–130.

Two–Photon Excitation in Functional Biological Imaging, Winfried Denk, Journal of Biomedical Optics 1(3), 296–304, Jul. 1996.

Terahertz Time–Domain Spectroscopy of Water Vapor, Martin van Exter et al., Optics Letter, vol. 14, No. 20, Oct. 15, 1989, pp. 1128–1130.

Efficient Frequency Doubling of a Femtosecond Fiber Laser, L. E. Nelson, et al., Optics Letters, vol. 21, No. 21, Nov. 1, 1996, pp. 1759–1761.

Femtosecond Distributed Solition Spectrum in Fibers, M. N. Islam, et al, J. Opt. Soc. Am. B/vol. 6, No. 6, Jun. 1989, pp. 1149–1158.

(List continued on next page.)

*Primary Examiner*—Mark Hellner
*Attorney, Agent, or Firm*—Sughrue, Mion, zinn, Macpeak & Seas, PLLC

[57] ABSTRACT

An apparatus generates femtosecond pulses from laser amplifiers by nonlinear frequency conversion. The implementation of nonlinear frequency-conversion allows the design of highly nonlinear amplifiers at a signal wavelength (SW), while still preserving a high-quality pulse at an approximately frequency-doubled wavelength (FDW). Nonlinear frequency-conversion also allows for limited wavelength tuning of the FDW. As an example, the output from a nonlinear fiber amplifier is frequency-converted. By controlling the polarization state in the nonlinear fiber amplifier and by operating in the soliton-supporting dispersion regime of the host glass, an efficient nonlinear pulse compression for the SW is obtained. The generated pulse width is optimized by utilizing soliton compression in the presence of the Raman-self-frequency shift in the nonlinear fiber amplifier at the SW. High-power pulses are obtained by employing fiber amplifiers with large core-diameters. The efficiency of the nonlinear fiber amplifier is optimized by using a double clad fiber (i.e., a fiber with a double-step refractive index profile) and by pumping light directly into the inner core of this fiber. Periodically poled $LiNbO_3$ (PPLN) is used for efficient conversion of the SW to a FDW. The quality of the pulses at the FDW can further be improved by nonlinear frequency conversion of the compressed and Raman-shifted signal pulses at the SW. The use of Raman-shifting further increases the tuning range at the FDW. For applications in confocal microscopy, a special linear fiber amplifier is used.

51 Claims, 11 Drawing Sheets

OTHER PUBLICATIONS

Generation of Femtosecond Optical Pulses with Nanojoule Energy from a Diode Laser and Fiber Based System, A. Galvanauskas et al., Appl. Phys. Lett, 63 (13), Sep. 27, 1993, pp. 1742–1744.

Subpicosecond Soliton Compression of Gain Switched Diode Laser Pulses Using an Erbium–Doped Fiber Amplifier, J. T. Ong, et al, IEEE Journal of Quantum Electronics, vol. 29, No. 6, Jun. 1993, pp. 1701–1707.

Pulse Compression by Nonlinear Pulse Evalution with Reduced Optical Wave Breaking in Erbium–Doped Fiber Amplifiers, K. Tamura et al., Optics Letters, vol. 21, No. 1, Jan. 1, 1996, pp. 68–70.

Wavelength–dependent Amplification Characteristics of Femtosecond Erbium–Doped Optical Fiber Amplifiers, Kenji Kurokawa et al, Appl. Phys. Lett. 58 (25), Jun. 24, 1996, pp. 2871–2873.

Amplification of Femtosecond Pulses in $Er^{3+}$–Doped Single–Mode Optical Fibers, Electronics Letter, vol. 26, No. 7, Mar. 29, 1990, pp. 456–458.

Passive, All–fibre Source of 30 fs Pulses, D. J. Richardson, et al., Electronics Letters, vol. 28, No. 9, April 9, 1992, pp. 778–779.

Amplification of Femtosecond Pulses in a Passive All–Fiber Soliton Source, D. J. Richardson, et al., Optics Letters, vol. 17, No. 22, Nov. 15, 1992, pp. 1596–1598.

Raman Effect in Birefringent Optical Fibers, C. R. Menyuk et al, Optics Letters, vol. 16, No. 8, Apr. 15, 1991, pp. 566–568.

Environmentally Stable Kerr–type Mode–Locked Erbium Fiber Laser Producing 360–fs Pulses, M. E. Fermann, et al, Optics Letters, vol. 19, No. 1, Jan. 1, 1994, pp. 43–45.

Generation of a Train of Fundamental Solitons at a High Repetition Rate of Optical Fibers, E. M. Dianov et al, Optics Letters, vol. 14, No. 18, Sep. 15, 1989, pp. 1008–1010.

Femtosecond Pulse Amplification in Cladding–Pumped Fibers, J. D. Minelly et al., Optics Letters, vol. 20, No. 17, Sep. 1, 1995, pp. 1797–1799.

Peak Power Fluctuations in Optical Pulse Compression, J.D. Kafka et al., IEEE Journal of Quantum Elec., vol. 24, No. 2, Feb. 1988.

FIG. 5
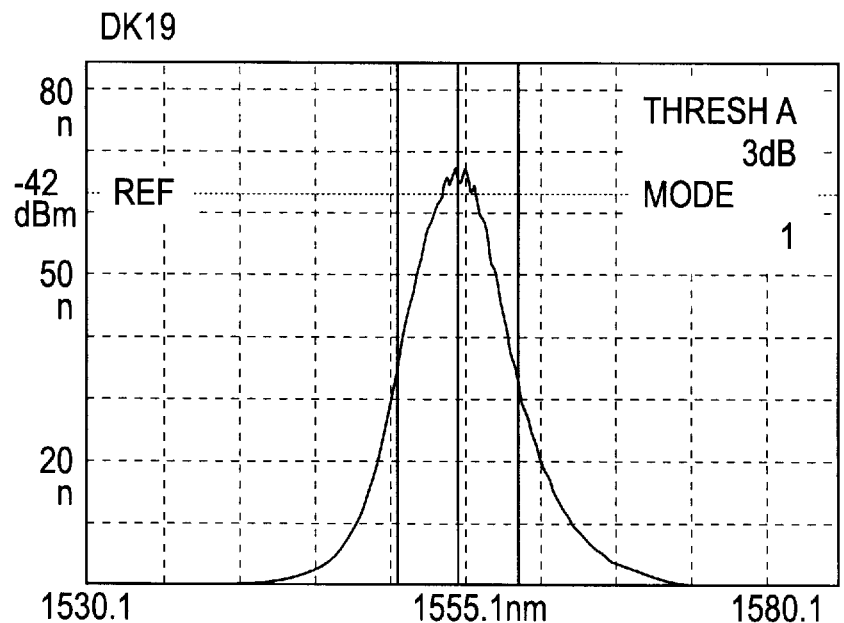
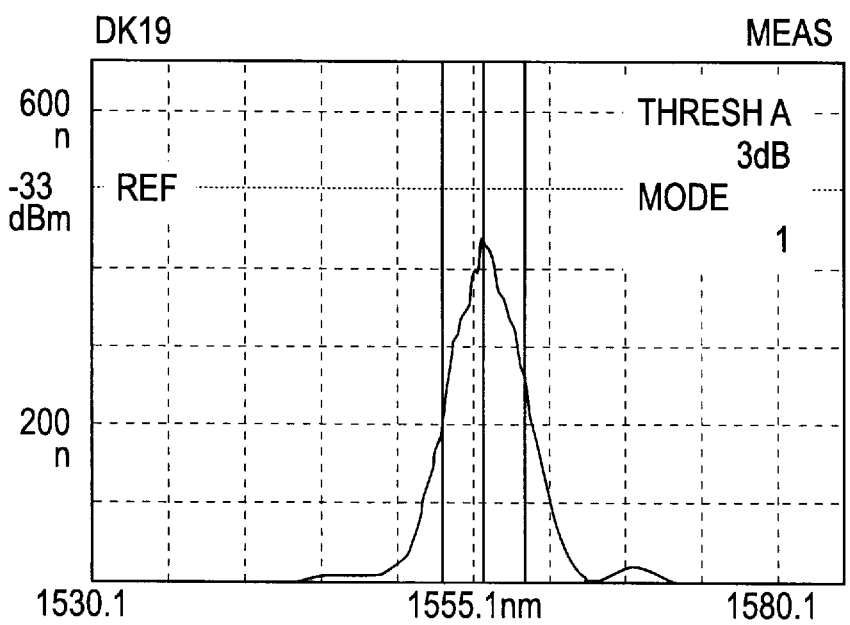

FREQUENCY CONVERTED SHORT PULSE OUTPUT

FREQUENCY CONVERTED SHORT PULSE OUTPUT

FREQUENCY CONVERTED SHORT PULSE OUTPUT

APPARATUS AND METHOD FOR THE GENERATION OF HIGH-POWER FEMTOSECOND PULSES FROM A FIBER AMPLIFIER

BACKGROUND OF THE INVENTION

1. Field of the Invention

The present invention relates to an apparatus and method for generating high-power femtosecond pulses, and particularly to a system employing an oscillator, an amplifier, a compressor and a frequency converter to generate femtosecond pulses.

2. Description of the Related Art

Techniques for the generation of short and ultra-short optical pulses in optical fibers have been known for a number of years and have recently been applied in many areas. For example, as disclosed in U.S. Pat. No. 5,530,582 issued to Clark (hereinafter Clark) and as reported by A. Hariharan et al. in "Alexandrite-pumped alexandrite regenerative amplifier for femtosecond pulse amplification", *Optics Letters*, Vol. 21, pp. 128 (1996) (hereinafter Hariharan), ultra-short optical pulses have been used as injection sources. Injection seeding of high-power amplifiers, as mentioned by Clark and Hariharan, greatly benefits from pulse wavelengths that are in the <1.2 $\mu$m range. Similar restrictions exist for many other currently pursued applications of ultra-short pulses, e.g., in THz generation (as reported by W. Denk in "Two-photon excitation in functional biological imaging", *Journal of Biomedical Optics*, Vol. 1, pp. 296 (1996)) or in confocal microscopy (as reported by van Exter et al. in "Terahertz time-domain spectroscopy of water vapor", *Optics Letters*, Vol. 14, pp. 1128 (1989)). Such wavelengths can be generated by frequency-doubling of the pulses from an ultrafast erbium fiber oscillator (as suggested by Clark and by L. E. Nelson et al. in "Efficient frequency-doubling of a femtosecond fiber laser", *Optics Letters*, Vol. 21, pp. 1759 (1996)), i.e., an oscillator generating pulses on the order of 100 fsec, or alternately from fiber oscillator-amplifier systems (as suggested by Hariharan). However, none of these publications teaches that the efficiency of frequency-doubling may be optimized by a restriction of the spectral acceptance bandwidth of the doubling crystal.

Moreover, none of these publications describes that superior performance may also be obtained by implementing oscillator/amplifier designs with nonlinear amplifiers or by implementing oscillator/amplifier designs with nonlinear compressors.

Pulses used in front of the pulse amplifier or compressor do not need to be derived from a fiber oscillator, as described in the above-mentioned publications by Clark and Hariharan. Alternatively, pulses from bulk optics (see Islam et al. in "Broad-bandwidths from frequency-shifting solitons in fibers", *Optics Letters*, Vol. 14, pp. 379 (1989)) or diode lasers (see Galvanauskas et al. in "Generation of femtosecond optical pulses with nanojoule energy from a diode laser and fiber based system", *Appl. Phys. Lett,* Vol. 63, pp. 1742 (1993) and Ong et al. in "Subpicosecond soliton compression of gain-switched diode laser pulses using an erbium-doped fiber amplifier", *IEEE Journal of Quantum Electronics,* Vol. 29, pp. 1701 (1993)) can be used. Note that the systems disclosed by Clark and Hariharan use linear amplifiers and do not suggest that pulses may be derived from a nonlinear amplifier. Further, the systems disclosed by Islam, Galvanauskas and Ong do not use frequency doubling.

In addition, generation of the shortest-possible pulses from oscillator-only type systems, such as those disclosed by Clark and Nelson et al., typically involves complicated cavity designs with relatively high optical losses, which are therefore not very efficient in producing a maximum output power for a given pump power.

With regard to compression schemes in ultra-short optical pulse generating systems, two options exist: using positive dispersion fiber (non-soliton supporting), as disclosed in U.S. Pat. No. 4,913,520 issued to Kafka and by Tamura et al. in "Pulse compression using nonlinear pulse evolution with reduced optical wave breaking in erbium-doped fiber amplifiers with normal group-velocity dispersion", *Optics Letters*, (1996); or using negative dispersion fiber (soliton supporting) as disclosed by Islam et al. See also, "Peak Power Fluctuations in Optical Pulse Compression", Kafka et al., *IEEE Journal of Quantum Elec.,* Vol. 24, pp. 341 (1988). Though positive dispersion fiber can, in principle, be used for the generation of pulses shorter than 10 fsec, such fibers require additional linear pulse compressors which are prohibitive for a low-cost design. Equally, in compression schemes with positive dispersion fiber, the Raman effect generally cannot be used as the effects of Raman conversion are considered detrimental (see Kafka).

Therefore, pulse compressors based on negative dispersion fiber are preferred, despite the fact that the generated pulse width is typically longer than 10 fsec, since such fiber compressors can be designed not to rely on external linear pulse compressors. In addition, such compressors can be designed to take advantage of the Raman-self-frequency shift in optical fibers, which tends to further broaden the spectrum of the compressed pulses (See Islam et al.).

However, this can lead to the generation of a low-level pedestal in the sought-after compressed pulse, which is deleterious in many applications of ultra-fast optics. On the other hand, the spectral evolution of the Raman pulse is useful, as it allows a certain degree of tunability (see Islam et al.). Such pulse compressors are described herein as soliton-Raman compressors (SRC).

An early system implementation of a SRC in an erbium amplifier fiber was described by K. Kurokawa et al. in "Wavelength-dependent amplification characteristics of femtosecond erbium-doped optical fiber amplifiers", *Appl. Phys. Lett.*, Vol. 58, pp. 2871 (1991). However, in the system disclosed therein, a diode laser provided the "seed" pulses for the SRC.

A further system implementation of a SRC in an erbium amplifier fiber relying on an impractical bulk laser signal and pump sources was reported by I. Y. Kruschev et al. in "Amplification of Femtosecond Pulses in $Er^{3+}$-doped single-mode optical fibers", *Electron. Lett.*, Vol. 26, pp. 456 (1990).

The first implementation of a SRC in an erbium amplifier using a fiber laser as the seed was described by Richardson et al. in "Passive all-fiber source of 30 fs pulses", *Electron. Lett.*, Vol. 28, pp. 778 (1992) and in "Amplification of femtosecond pulses in a passive all-fiber soliton source", *Optics Letters*, Vol. 17, pp. 1596 (1992). However, the systems disclosed in the publications by Islam et al., Galvanauskas et al., Ong et al., Kafka, Tamura et al., Kurokawa er al., Khrushchev et al. and Richardson et al. did not implement any frequency conversion using a nonlinear amplification system, so as to form a FDW.

Further, the systems disclosed in the publications by Islam et al., Galvanauskas et al., Ong et al., Tamura et al., Kurokawa er al., Khrushchev et al. and Richardson et al. do not provide for any control of the polarization state in the SRC. Currently, SRCs take advantage of the Raman effect in optical fibers, which in turn is dependent on the polarization state of the light in the optical fiber and on the fiber birefringence, as disclosed by Menyak et al. in "Raman effect in birefringent optical fibers", *Optics Letters*, Vol. 16, pp. 566 (1991). In addition, nonlinear polarization evolution may take place in highly nonlinear SRCs, as reported by Fermann et al. in *Optics Letters*, Vol. 19, pp. 45 (1994). Hence, a reproducible and stable SRC cannot be constructed without polarization control.

Also, the publications listed in the preceding paragraph do not teach how to maximize the efficiency of SRCs in general and how to maximize the pulse energy of the compressed pulses generated with the SRCs. Since the doubling efficiency obtainable with non-critically phase-matched doubling crystals, such as periodically poled $LiNbO_3$ (PPLN), is dependent mainly on the pulse energy and not critically dependent on pulse width (when using confocal focussing), pulse energy-maximization is clearly a critical issue.

In the aforementioned publication by Richardson et al., it was suggested that an unspecified control of the mode size of an oscillator fiber and an amplifier fiber can lead to the generation of the shortest possible pulses. However, a maximization of the pulse energy from such a system may in fact produce a higher power at the FDW.

As an alternative to SRC, adiabatic soliton amplification has been discussed for pulse compression (see E. M. Dianov et al., *Optics Letters*, Vol. 14, pp. 1008 (1989)). In general, the adiabacity condition requires that the gain coefficient $\alpha$ per soliton period is much smaller than 1. Here, the soliton period of the soliton is defined as $L_d \approx 0.5|\beta_2|/\tau^2$, where $\tau$ is the FWHM (full width half maximum) pulse width of the soliton and $\beta_2$ is the group-velocity dispersion of the fiber. Alternatively, in adiabatic soliton amplification, the break-up of the fundamental N=1 soliton into an N=2 soliton has to be prevented. As the energy of an N=2 soliton for the same pulse width is 4 times higher than for an N=1 soliton, the gain g per soliton period should be smaller than about 2. As a result, typically amplifier lengths of tens of meters up to km lengths have to be employed, which is not practical. Equally, due to higher-order nonlinear effects in the fiber, the pulse energy after such longer fiber lengths may be lower compared to what is possible with short amplifiers.

As yet another alternative to SRC, femtosecond pulses may be amplified by chirped pulse amplification (CPA) in optical fibers, as disclosed by Minelly et al. in Optics Letters, Vol. 20, pp. 1797 (1995) and in U.S. Pat. No. 5,499,134 issued to Galvanauskas et al. However, typically no pulse-shortening, rather, pulse broadening due to the finite bandwidth of the gain-medium and the employed gratings used for pulse-compression and pulse stretching, is so obtained. Thus, such systems are less useful, unless the pulse energy approaches approximately a few nJ.

In the system described by Minelly et al., a double-clad fiber, i.e. a fiber with a double-step refractive index profile was implemented as the fiber amplifier. Thus, cladding pumping (as disclosed in U.S. Pat. No. 4,829,529 issued to Kafka) was implemented to deliver the pump light into the fiber amplifier. As taught in the publication by Minelly et al., the mode size of the fundamental single mode can be increased in such fibers, while still preserving a high index-raising dopant solvent ($Al_2O_3$ in Minelly et al.) concentration. In turn, a high concentration of a dopant solvent can increase the solubility of a dopant ($Er^{3+}$ in Minelly et al.), which can lead to a high quantum efficiency for such an amplifier.

However, Minelly et al. do not teach that the performance of such fibers can be optimized for femtosecond pulse amplification by directing the pump light directly into the core, rather than by implementing cladding-pumping.

As an alternative to CPA, linear amplification of short optical pulses can also be considered. Whether an amplifier can be considered linear or not depends on the nonlinear phase delay $\Phi_{nl}$ incurred by the amplifier. Assuming a linear increase in pulse energy with fiber length in a saturated amplifier and an amplification rate much faster than the adiabaticity condition, the nonlinear phase delay $\Phi_{nl}$ of a pulse in an amplifier of length L is then given approximately by $$\Phi_{nl} = \frac{2\pi n_2}{A\lambda} \frac{E}{\tau} \frac{L}{2}, \qquad (1)$$

where $n_2$ is the nonlinear refractive index; $n_2 = 3.2 \times 10^{-20} W^{-1}$ for silica glass, A is the core area, $\lambda$ is the signal wavelength and $\tau$ is the pulse width. Here dispersion-free single-pass amplification was assumed; for double-pass amplification L/2 is replaced by L. Conventional laser amplifiers are typically designed to provide a good pulse quality at a signal wavelength, which implies a design for an amplifier with $\Phi_{nl} < 5$.

Note that the problem of polarization control in non-polarization maintaining fiber can be minimized by implementing Faraday rotator mirrors (FRMs). However, previous uses of FRMs in fact were limited to linear fiber amplifiers, as disclosed in U.S. Pat. No. 5,303,314 to Duling et al., or ultrafast femtosecond fiber lasers only, as disclosed in the above-mentioned publication by Fermann et al.

All of the above-mentioned articles and patents are incorporated herein by reference.

SUMMARY OF THE INVENTION

It is an object of the present invention to efficiently convert short optical pulses at a signal wavelength (SW) to short optical pulses at a frequency-doubled wavelength (FDW). To meet this objective, the system of the present invention comprises a short pulse oscillator, an amplifier, a compressor and a frequency converter, wherein the amplifier and the compressor can be highly nonlinear and the process of amplification and compression can be combined in one optical unit. The implementation of a frequency-conversion process allows the use of very highly-nonlinear amplifiers or compressors at a signal wavelength (SW) without compromising the pulse quality at a frequency-doubled wavelength (FDW).

The oscillator-amplifier-compressor design can be more power-efficient than basic oscillator-only designs, since the generation of the shortest-possible pulses from oscillators typically involves complicated cavity designs with relatively high optical losses, which are therefore not very efficient in producing a maximum of possible output power for a given pump power. In addition, the implementation of a nonlinear amplifier/pulse compressor allows the use of oscillator seed pulses with significantly longer pulse widths than in oscillator-only schemes to obtain a final given ultra-short pulse width. This, in turn, allows a simplification of the oscillator design and results in a substantial cost reduction for the system.

A specific system implementation comprises a short pulse fiber laser oscillator, a fiber amplifier, a soliton-Raman compressor (SRC) and a nonlinear crystal (NC), where nonlinear frequency-conversion takes place predominantly in the NC. By a judicious design of the SRC and a judicious choice of the NC, the efficiency of the conversion process is maximized and near-bandwidth-limited pulses at the FDW are generated even with low-quality pulses at the SW.

The SRC is optimized by control of its polarization state and its dispersion characteristics, by employing fibers with large mode sizes, and by controlling the amount of Raman shifting in the amplifier.

According to one embodiment of the present invention, the fiber amplifier is combined with the SRC, where the amplifier efficiency can be optimized by implementing fibers with double-step refractive index profiles. Long term drifts of the polarization state are avoided by using a Faraday rotator mirror (FRM) in conjunction with an amplifier and a SRC. Alternatively, the use of polarization-maintaining erbium-doped fiber can be used for the amplifier and the SRC.

The present invention demonstrates that frequency conversion can be predominantly implemented for only the compressed part of the pulses emerging from the SRC, whereas the uncompressed pulse part can be suppressed in the nonlinear frequency-conversion process. Further, by selecting a nonlinear process with an acceptance bandwidth smaller than the bandwidth of the pulses emerging from the SRC, the efficiency of nonlinear frequency conversion can be optimized.

According to another aspect of the present invention, Raman-shifting in the SRC and the implementation of a nonlinear frequency-conversion process allows for a limited tunability of the FDW.

According to another aspect of the present invention, pump light is pumped directly into the fiber core of a double-clad fiber to take advantage of the fact that the pump absorption in the fiber core is higher than absorption in the cladding by a factor proportional to the ratio (area of the inner cladding)/(core area). This arrangement allows the use of shorter amplifier fibers than possible with cladding pumping, which in turn minimizes the nonlinearity of the amplifier for femtosecond pulse amplification.

Finally, when adapted for confocal microscopy applications, the performance of a pulse source/fiber amplifier/frequency converter arrangement of the present invention may be optimized by selecting near-bandwidth-limited pulse sources that produce relatively long pulses so as to allow for nearly linear amplification in the fiber amplifier.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which:

FIG. 5 depicts the decreased spectral width in the oscillator and in the amplifier due to self-phase modulation in the amplifier when the pump power is reduced;

DETAILED DESCRIPTION OF A PREFERRED EMBODIMENT

By way of example only, three preferred embodiments of the present invention are described herein. The objective of the system of the first embodiment is to maximize the average power at the frequency-doubled wavelength (FDW) without compromising the pulse width. The objective of system of the second embodiment is to maximize the average power at the FDW specifically to optimize the efficiency for use of the FDW in confocal microscopy. The objective of the system of the third embodiment is to minimize the required pump power to the fiber amplifier of the system.

Figure 1:
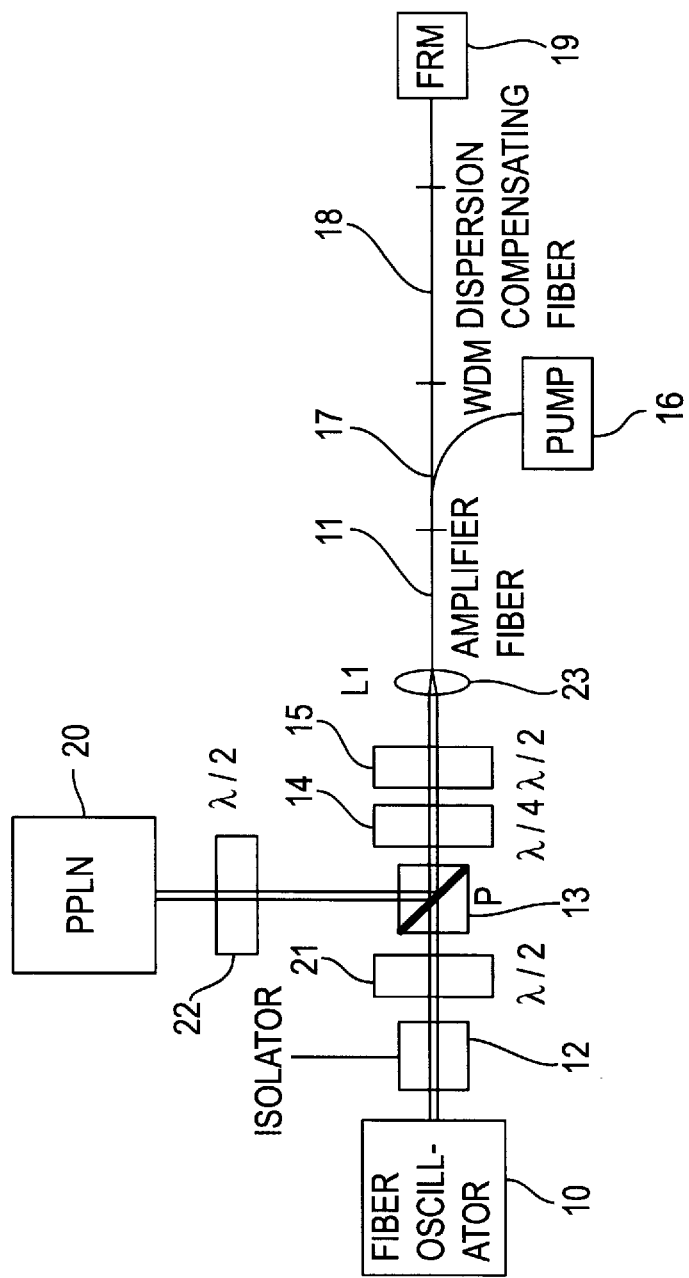
FIG. 1 illustrates a double-pass configuration of the apparatus of the present invention.

FIG. 1 illustrates the configuration of a high-power femtosecond pulse generating system according to a first embodiment of the present invention. As shown in FIG. 1, a fiber oscillator 10 provides seed pulses. The fiber oscillator 10 can be, for example, an environmentally stable erbium fiber laser operating at a wavelength of 1.5 $\mu$m. Such a fiber oscillator was disclosed in the publication by Fermann et al. described above. The fiber oscillator 10 is capable of delivering 300 fsec bandwidth-limited pulses at a repetition rate of 50 MHz with an adjustable average output power from 1 to 5 mW. Preferably, the pulses are linearly polarized.

It should be noted that the seed pulses need not be derived from a fiber oscillator; alternatively, pulses from bulk-optics or diode lasers can be used. From a cost perspective, pulses from either a diode laser or a fiber laser oscillator are preferable. In general, a fiber oscillator is expected to produce cleaner and shorter pulses which is advantageous for efficient nonlinear pulse compression to take place. Equally, as applications of ultra-fast pulses will require as much pulse power as possible from an easy-to-manufacture optical design, the use of amplifiers that combine the action of pulse amplification and pulse compression can also be very effective.

In the system of the first embodiment, pulses with an average power of 2 mW are coupled into a soliton-Raman compressor (SRC) erbium amplifier fiber 11 via an isolator 12 for the signal light at 1.5 $\mu$m, a subsequent polarization beam splitter 13, and two waveplates 14 and 15 employed after the polarization beam splitter 13 to enable an adjustment of the polarization state of the signal light launched into the amplifier fiber 11. Waveplate 21 (shown to the left of the polarization beam splitter 13 in FIG. 1) optimizes throughput to the polarization beamsplitter 13, waveplate 22 optimizes the polarization state into the PPLN 20 (described below), and lens system 23 couples the signal light into the amplifier fiber 11. The overall launching efficiency from oscillator 10 to the amplifier fiber 11 is controlled by appropriate use of mode-matching lenses and an efficiency of 70% or higher (up to 100%) can be achieved.

Figure 2:
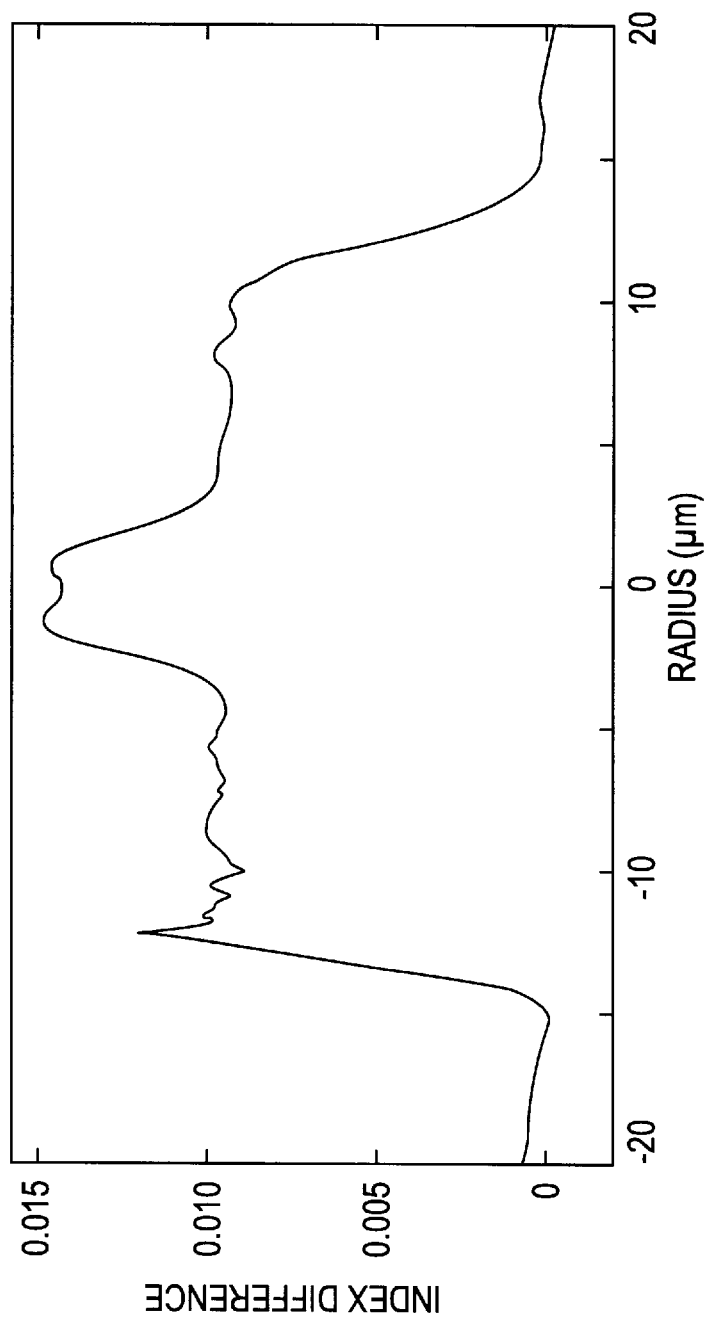
FIG. 2 depicts the refractive index profile of the amplifier of the first embodiment.

In the example of the first embodiment, the amplifier fiber 11 is non-polarization maintaining and has an $Er^{3+}$ doping level of 0.1 mole % and a double-step refractive index profile. The refractive index profile of the amplifier fiber 11 is depicted in FIG. 2. The inner core has a numerical aperture (NA)≈0.12 and a diameter of about 8 μm. The outer core has a diameter of about 25 μm and an NA of 0.18. Note that the pump-light can be directed directly into the inner core of the amplifier fiber 11. The amplifier fiber 11 is pumped by a pump 16 at 1.48 μm through a wavelength-division multiplexing coupler (WDM) 17, where the pump light passes through a wide-bandwidth isolator to avoid damage from leakage of the high-power signal light at 1.5 μm. After the WDM 17, a pump power of 100 mW is delivered into the amplifier fiber 11. In the first embodiment, the length of amplifier fiber 11 is approximately 2.5 m; the overall length of the WDM fiber leads employed for signal light propagation is limited to 0.50 m. Although FIG. 1 illustrates a dispersion-compensating fiber 18, which will be described in more detail below, the system of the first embodiment need not employ a dispersion-compensating fiber.

In the first embodiment, the amplifier fiber 11 is $Er^{3+}$ doped fiber. However, the amplifier fiber 11 may be a fiber doped with $ErYb^+$, Pr, Tm, Ho or any rare earth doped fiber combined with an appropriate oscillator. Further, the amplifier fiber 11 of the first embodiment also serves as the SRC; however, the amplifier and SRC may be separate components.

As shown in FIG. 1, a double-pass configuration can be used for signal light amplification. In the double-pass configuration, it is beneficial to implement a Faraday rotator mirror (FRM) 19 at one end of the amplifier fiber 11. The polarization state of the light at the output of the amplifier fiber 11 is then orthogonal to the polarization state at the input, and, therefore, the aforementioned polarization beam splitter 13 can be employed for near 100% efficient output-coupling of the amplified light from the system. Although a FRM is shown in FIG. 1, any fiber polarization controller or a λ/4 waveplate may be used.

Note that even in the presence of the nonlinear frequency-shift sought in the amplifier fiber 11, adjustments of the two-waveplates 14 and 15 at the input of the amplifier fiber 11 allow a very efficient output coupling of the amplified light. Further, an adjustment of the waveplates 14 and 15 allows an optimization of the SRC by controlling the polarization state in the fiber and by controlling any nonlinear polarization evolution in the amplifier fiber 11.

In experiments conducted with the system of the first embodiment, after the double pass-through the amplifier fiber 11, an average output power of 30 mW (pulse energy of 600 pJ) was measured. When replacing the seed signal pulses with a cw signal of the same average power level, an average power of up to 37 mW was extracted from the amplifier fiber 11. The 20% energy loss under pulsed amplification arises from the Raman shift of the amplified pulses at the signal wavelength (SW). In the example of the first embodiment, the Raman shift is 20 nm, which pushes the signal pulses outside the gain-bandwidth of erbium. In addition, optical losses can be incurred due to the finite bandwidth of the optical elements (WDMs, etc.) traversed by the amplified pulses.

As shown in FIG. 1, the amplified and compressed pulses are frequency doubled in a length of 0.8 mm of periodically poled $LiNbO_3$ (PPLN) 20, where confocal focusing is used. In this example, the PPLN 20 is not AR-coated. The poling period of the PPLN is set at 19.25 μm, chosen to approximately coincide with the peak of the spectrum of the compressed pulse from the SRC. Heating of the PPLN 20 to temperatures between 50° C.–150° C. can be employed for fine tuning of the optimum frequency-doubling wavelengths as well as to avoid photo-refractive damage in the PPLN 20. The length of the PPLN is chosen to produce a frequency-doubling bandwidth of a magnitude comparable to or smaller than the bandwidth of the compressed pulses from the SRC. Note, however, that the spectral acceptance bandwidth of the PPLN at the SW can be very much smaller than the extent of the spectrum at the SW without a penalty in terms of overall doubling efficiency. The PPLN efficiently frequency converts even an SW spectrum outside its nominal acceptance bandwidth. This is due to a nonlinear process similar to sum-frequency-generation which takes place in the PPLN, as discussed below. This is in contrast to a frequency-converter design featured in the above-mentioned publication by Nelson et al., which does not discuss issues related to a finite acceptance bandwidth of a frequency conversion crystal.

Figure 3:
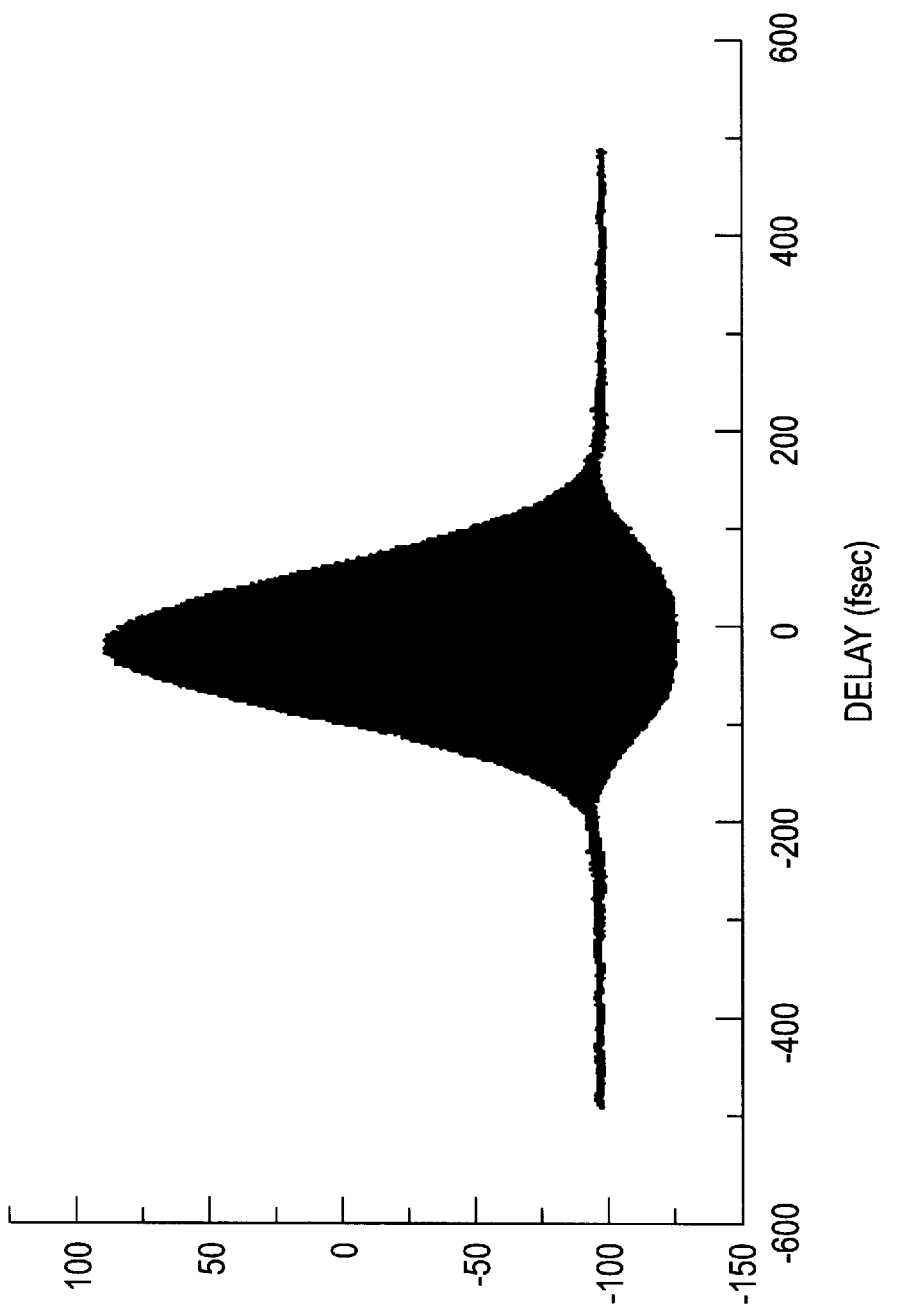
FIG. 3 depicts an interferometric autocorrelation of the frequency-doubled optical pulses according to the first embodiment of the present invention.

The frequency doubled pulses have a wavelength of 790 nm, an average power of 6.3 mW, a pulse width of 120 fsec and a time-bandwidth product of 0.66, assuming a gaussian pulse shape. Thus, the resulting pulses are within a factor of 50% of the bandwidth limit. An interferometric autocorrelation of the pulses is shown in FIG. 3, which demonstrates the good quality of the pulses. Note that by changing the polarization state in front of the SRC amplifier fiber 11, a variation in the measured frequency-doubled power between 0.1 and 6.3 mW is observed, which demonstrates the need for polarization control in this highly nonlinear amplifier.

The resulting conversion efficiency from pump light to femtosecond pulses at the frequency-doubled wavelength is thus 6.3%. On the other hand, the conversion efficiency of signal light to frequency doubled light is 21%. Thus, the SRC has a compression efficiency of about 60%, which compares very favorably with results achievable from positive dispersion fiber compressors, such as that disclosed in U.S. Pat. No. 4,913,520 discussed above.

These experimental results were obtained by implementing an amplifier with a large core diameter to maximize the energy of the compressed pulses emerging from the SRC. For a pulse of fixed width τ, the soliton energy W scales proportionally to the fiber core area A and the fiber dispersion $β_2$. As the SRC creates a soliton-like pulse, a maximization of the core area allows a maximization of the generated soliton pulse energy from the SRC. Moreover, a large core diameter also minimizes the fiber waveguide dispersion, which in turn maximizes the total fiber dispersion $β_2$. Though the latter is only a secondary effect, it further increases the pulse energy.

Note that the signal after the double-pass through the amplifier fiber 11 is actually smaller than after a single pass. Apart from energy losses incurred due to the large amount of Raman-shifting taking place in the amplifier fiber 11, the amplifier fiber 11 is also overlength, i.e., most of the pump light is absorbed by the time it reaches the launch end of the amplifier fiber 11. Thus, the amplifier is not fully inverted at this end and signal loss at the signal wavelength occurs.

Next, the second embodiment of the present invention will be described. The design criteria for the system of the second embodiment are chosen primarily to meet the requirements of a two-photon confocal imaging system. It is assumed that the FDW (around 800 nm in these examples) is used as the source for two-photon excitation. The number of photons M created by two photon excitation for a fixed beam diameter can be shown to be proportional to:

$$M = \text{const} \frac{\overline{P^2}}{f\tau}, \qquad (2)$$

where const is a constant; P, f, τ are the average power, the repetition rate and the FWHM pulse width of the excitation source respectively. According to Eq. 2, it is clearly more important to increase the average power rather than to decrease the pulse width for efficient two-photon confocal imaging. Note, however, that in actual biological systems, damage thresholds as well as photo-bleaching considerations of the biological samples related to pulse power, energy and width may exist, which are not accounted for by Eq. (2). However, in the description of the second embodiment, maximization of the average power at the FDW is described without consideration of damage or photo-bleaching issues.

Figure 4:
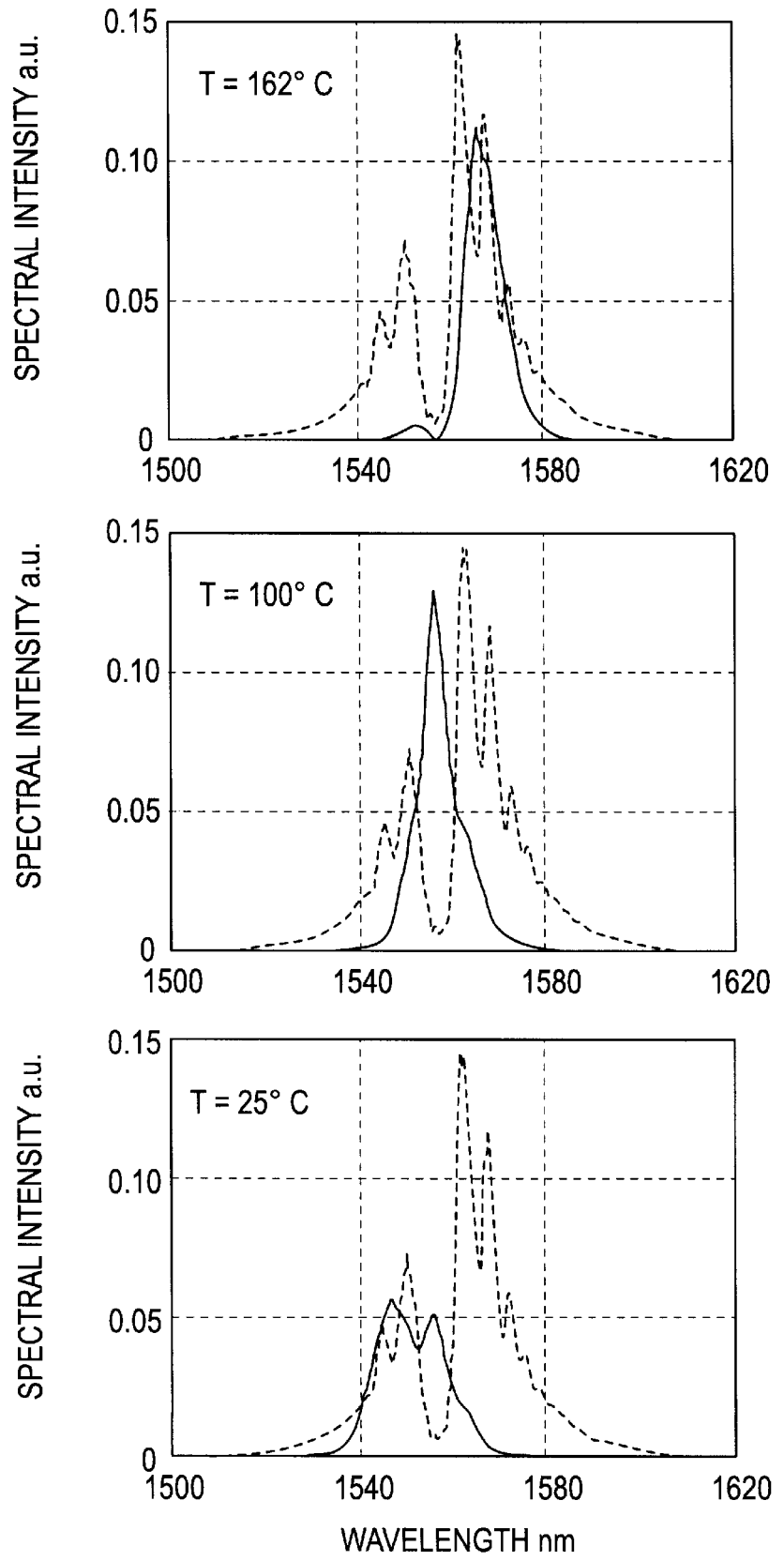
FIG. 4 depicts the spectra of the pulses emerging from the SRC at different temperatures of the PPLN according to the second embodiment of the present invention.

The arrangement shown in FIG. 1 also applies to the second embodiment. The second embodiment differs from the first embodiment in that an oscillator power of 4 mW is employed. The amplifier fiber 11 is similar to that of the first embodiment; however, the NA of the inner core is lowered to about NA=0.10 and the inner core size is increased to approximately 10 μm. Further, the Er-doping level is reduced by about 25% to approximately 750 ppm. The length of the amplifier fiber 11 is 2.6 m and is chosen to produce the highest average power for linear operation of the amplifier (i.e., by using a cw signal of 4 mW as the seed). The length of the PPLN 20 is increased to 1.2 mm to increase the length of the pulses at the FDW; the period of the PPLN 20 is reduced to 18.75 μm to allow efficient frequency doubling at 1.56 μm. In experiments conducted with the system of the second embodiment, a double-pass of the seed pulses through the amplifier fiber 11 generated 54 mW at the SW, whereas a double-pass of a cw signal generated a power of 57 mW at the SW, i.e. a signal loss of only 5% was incurred by the nonlinear operation of the amplifier. The spectrum of the pulses emerging from the SRC was found to be centered at 1.56 μm (as shown in FIG. 4). The pulses at the FDW were found to have a wavelength of ≈780 nm, an average power of 12 mW, a pulse width of 190 fsec with a spectral width within 50% of the bandwidth limit. A change in polarization in front of the SRC amplifier fiber 11 produced a change in power at the FDW of between 7–12 mW. The resulting conversion efficiency to the FDW is 22%, accounting for reflection losses, the conversion efficiency increases to 29%. Compared to the system of the first embodiment, the number of photons M is increased by a factor of 2.2.

The high power at the FDW in the second embodiment is a result of optimizing the linear amplifier efficiency and of limiting the Raman shift of the pulses to wavelengths close to the wavelength of the oscillator pulses (within about 10 nm in this example). This is in contrast to the system reported by Richardson et al. in "Amplification of femto-second pulses in a passive all-fiber soliton source" (discussed above), where a Raman shift of 30 nm was used. The pulse width of the Raman soliton in the second embodiment is clearly longer than in the first embodiment. In fact, due to the reduced nonlinearity of the amplifier, the Raman soliton may not be fully developed and pulse compression may arise to a large extent from higher-order soliton compression. However, due to the relative insensitivity of M on the pulse-width, the system of the second embodiment produces an M higher than for the first embodiment.

The high frequency conversion efficiency obtained in both the first and second embodiments is also due to the exploitation of a more general frequency-conversion process than just frequency doubling. To verify the presence of such a nonlinear frequency conversion process, the temperature of the PPLN 20 was varied while the spectra at the SW and the FDW were measured. The results are shown in FIG. 4. Note that, due to the presence of higher-order soliton compression, the spectrum at the SW is split into two parts, with a depletion in the middle of the spectrum, which corresponds to the location of the spectrum of the injected oscillator pulse. At T=162° C., frequency conversion is obtained mainly at the Raman-shifted wavelength; at T=100° C. frequency conversion is obtained at the depletion point, whereas at T=25° C., frequency conversion is obtained mainly at the blue end of the SW spectrum. The conversion efficiency to a FDW was observed to be highest at the depletion point, which clearly cannot be explained from simple second-harmonic generation alone. Rather, a process like sum-frequency generation creates the FDW. However, at this time, the exact physical origin of this phenomenon is not known. Some possible explanations are: the resonant nature of the frequency-doubling process in the PPLN; effects due to the pulse chirp; effects due to cascaded second-order nonlinearities in the crystal; or even effects due to the imaginary part of the second or third-order nonlinearity of the PPLN 20 or an interplay between higher-order nonlinearities in the PPLN 20. Hereinafter, this nonlinear process is simply referred to as a sum-frequency-generation-like frequency-conversion (SLF).

It was experimentally observed in the example of the second embodiment that SLF allows the use of a nonlinear crystal (NC) with a doubling bandwidth much smaller than the bandwidth of the SRC, without compromising the conversion efficiency to a FDW. This is useful, as it allows control of the pulse-width of the pulses of the FDW without compromising the power at the FDW. In other words, the NC crystal can efficiently convert the power at the SW to a FDW by drawing in energy from most. of the spectrum of the pulses at the SW (i.e., from a spectrum that is greater than the spectral acceptance bandwidth of the NC crystal); thus, pulses at the SW of relatively poor quality may be employed for efficient frequency conversion. This is a valuable feature for the design of any amplifier/frequency-converter assembly, since this feature enables efficient frequency conversion not only at a single SW, but in a wavelength range tunable within the whole spectral extent of the SW, as shown in FIG. 4.

It is instructive to calculate the nonlinearity of the above amplifier using Eq. (1). For an input pulse width τ of 300 fsec and a pulse energy of E=1.2 nJ, $\Phi_{nl}$=16.6 is obtained. Thus, even highly nonlinear amplifiers (compressors) can produce very high-quality pulses once FDW is employed. This principle was not suggested by the aforementioned publications by Clark and Nelson et al.

Further, it is instructive to compare the performance to a linear amplifier. For comparison with a linear amplifier, the pump power is reduced to obtain an amplified pulse energy of 400 pJ, resulting in $\Phi_{nl}$≈5. Due to self-phase modulation in the amplifier, the spectral width decreases from around 8.2 nm (top) in the oscillator to 5.7 nm in the amplifier (bottom), as shown in FIG. 5. As shown in FIG. 5, as expected, a higher spectral quality of amplified pulses in "linear" amplifiers is obtained.

Next, the system of the third embodiment will be described. The arrangement shown in FIG. 1 also applies to the third embodiment. According to the third embodiment, an environmentally-stable oscillator is employed that delivers 50 pJ pulses at a repetition rate of 5 MHz. The pulses have a bandwidth of 20 nm and are positively chirped, i.e., the chirp can be compensated with a length of about 8 meters of soliton supporting fiber (Corning SMF28). After implementing chirp compensation the measured pulse width at the SW was observed to be 190 fsec (assuming a Gaussian shape), i.e., nearly bandwidth-limited pulses can be thus obtained after chirp compensation.

The design of the amplifier system of the third embodiment is similar to those described in the first and second embodiments with the following exceptions. The amplifier fiber 11 has an NA of approximately 0.16 and a core diameter of approximately 6 $\mu$m. The amplifier length is 1.1 m. The amplifier is pumped with 90 mW of pump light at 980 nm. A dispersion-compensating fiber 19, which can be a section of several meters of standard telecom fiber (Corning SMF 28), is inserted between the WDM 17 and the FRM 19 for dispersion compensation. The total length of the fiber between the input and the output of the amplifier system through which the signal light propagated is adjusted to obtain optimum dispersion compensation of the oscillator pulses. This optimization can be verified by measuring the pulse width of the pulses emerging from the amplifier with an autocorrelator and adjusting the length of the inserted standard telecom fiber until a minimum pulse length emerging from the system is obtained. During the dispersion-adjustment phase, the pump power to the amplifier is reduced to a level where any nonlinear processes in the amplifier are minimized, such that no Raman-shifting of the signal is observed.

In the third embodiment, the design of the frequency doubler system is identical to the previous embodiments, but the PPLN 20 having a length of only 600 $\mu$m is employed. The system of the third embodiment has the advantage that the dispersion of the amplifier system can be adjusted to zero and can be controlled easily, which is useful in obtaining the shortest possible pulses from the SRC. Further, as the pulses are strongly chirped throughout the whole length of the amplifier, any nonlinearities occur only in the last part of the amplifier, which is beneficial in obtaining the highest possible output pulses energy from the SRC.

In the system of the third embodiment, the signal pulses are amplified to a power of 4 mW (a pulse energy of 800 pJ/pulse). After frequency doubling, 100 fsec pulses with an average power of 1 mW were experimentally obtained at 790 nm. The time-bandwidth product was found to be about 0.50 assuming gaussian pulses; thus, the pulses were within 10–20% of the bandwidth limit. This demonstrated the beneficial effect of the dispersion adjustment implemented in this system. The frequency-doubling efficiency was found to be 25% and lower than expected for a bandwidth-limited 800 pJ signal pulse.

In all of the above-described embodiments, relatively high erbium doping levels between 700–1500 ppm are implemented, despite the decrease in quantum efficiency of these types of amplifiers compared to lower doping levels. These high doping levels allow a minimization of the employed amplifier lengths. As 1 nJ pulses with a width of 100 fsec have a peak power of 10 kW, they experience substantial nonlinearities in only 20–30 cm of fiber, even for large-core amplifiers. Further, 100 fsec pulses are affected by third-order dispersion in the fiber 11. Therefore, it is beneficial to minimize the length of the amplifier system to maximize the pulse quality and to minimize the obtainable pulse width. In general terms, however, the length of the amplifier system should not be too short, as at least the onset of higher-order soliton compression has to be ensured to enable substantial pulse shortening. In fact, if the nonlinearity of the amplifier is too small, self-phase modulation in negative-dispersion fibers will lead to pulse broadening, as shown in FIG. 5.

In addition to the above-described embodiments, several other embodiments of the invention are possible. In particular, dispersion optimization or a zero-dispersion system can be employed in the systems of the first or second embodiments or any amplifier system. A combination of positive or negative dispersion fiber may be used to achieve dispersion optimization. In the first and second embodiments, a positive dispersion-compensating fiber 18 of an appropriate length can be inserted between the WDM 17 and the FRM 19, as shown in FIG. 1.

Figure 6:
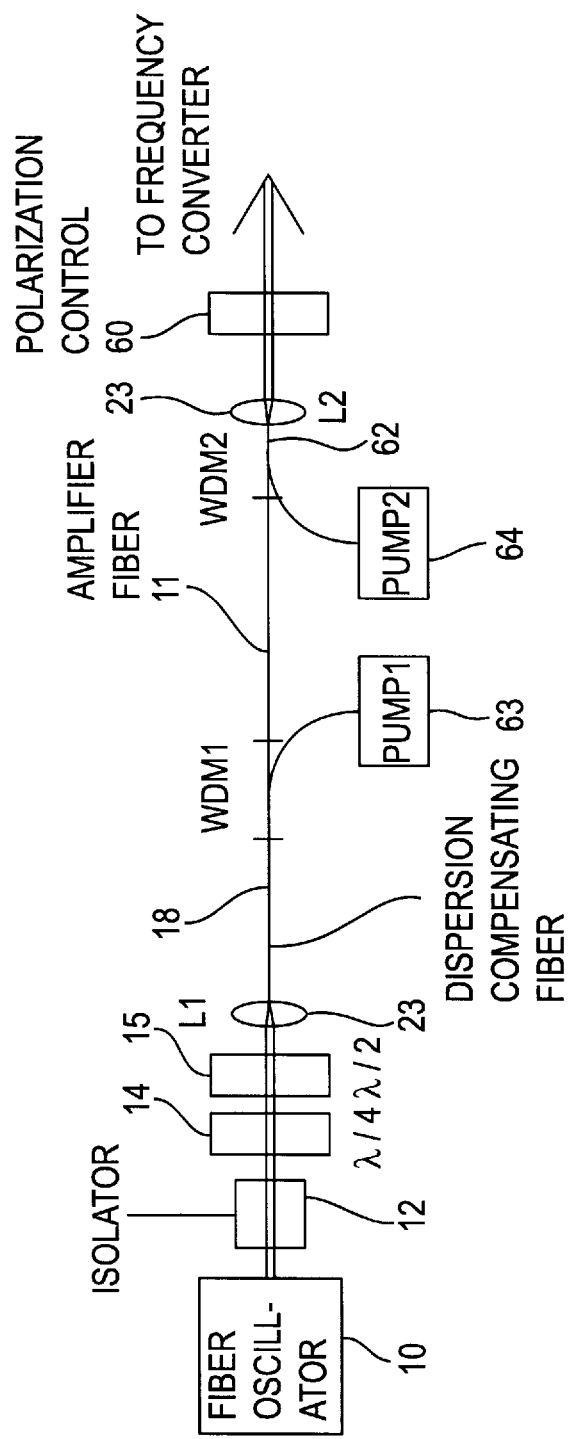
FIG. 6 illustrates a single-pass configuration of the apparatus of the present invention.

Further, a single-pass configuration can be implemented in the SRC. A system implementation is illustrated in FIG. 6. To enable full polarization stability, a polarization maintaining amplifier (PMA) can be used. The polarization of the light from the oscillator 10 is then aligned with one of the polarization axes of the PMA. The polarization state at the output is adjusted to give the highest doubling conversion efficiency. However, a polarization maintaining fiber is not a requirement in a single-pass configuration, as a combination of waveplates can be used at the input (14, 15) and output (60) of the SRC to maximize the efficiency of the frequency-doubling process, as shown in FIG. 6. However, better long-term and environmental stability is expected with a polarization-maintaining fiber. Further, a different kind of WDM 61 (and 62) can also be implemented. In the WDMs 61 and 62 shown in FIG. 6, the pump light is coupled into the amplifier 11 via a micro-optical arrangement incorporating dichroic mirrors. Such WDMs can in fact have free-space outputs, which is useful in minimizing any coupler leads and optical losses in amplifier systems. Clearly, a fully polarization-stable system requires polarization-maintaining fiber throughout the amplifier system. The splices between different sections of polarization-maintaining fiber should ensure that the polarization axes of the fibers are aligned.

As it is beneficial to have as much pump power as possible available for the SRC, more than one pump diode can be employed. An arrangement with two pump diodes 63 and 64 is also shown in FIG. 6. A similar arrangement could be used with a double-pass for the signal light (not shown). Moreover, polarization beamsplitters for the pump light can be included at the WDM couplers to allow the use of up to four pump diodes (not shown).

Figure 7:
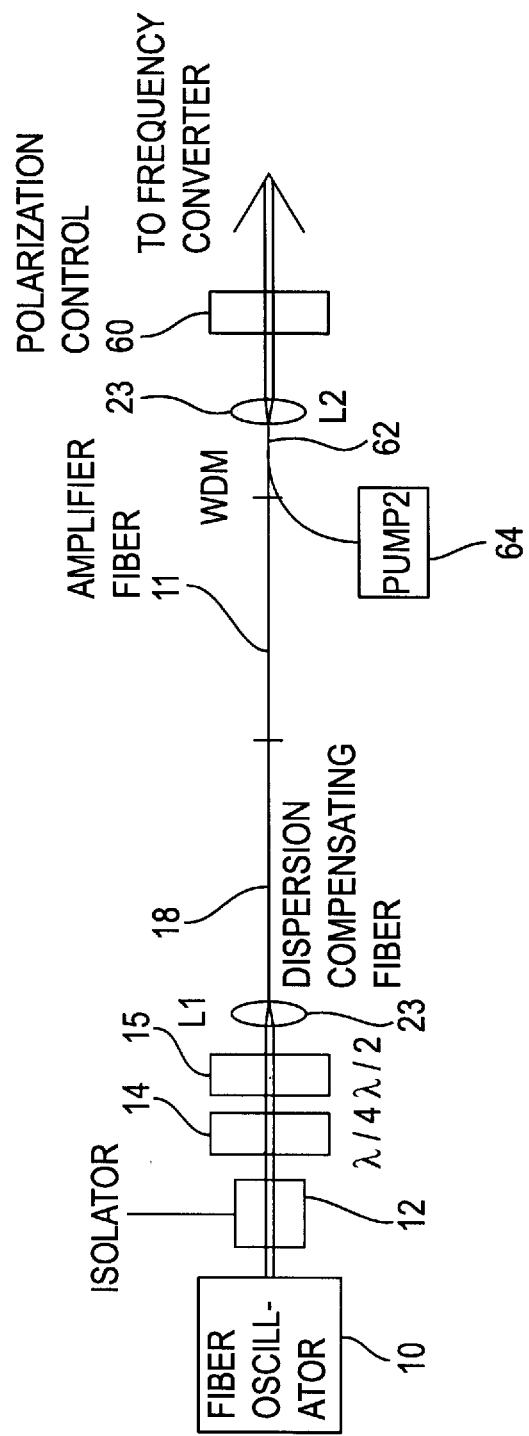
FIG. 7 illustrates an embodiment of the present invention in which contra-directional pumping is employed.

In addition to higher-order soliton compression or the generation of Raman solitons, adiabatic pulse amplifiers may also be used to shorten the pulse width from the oscillator. To ensure amplification close to adiabacity, a contra-directionally pumped amplifier system, as shown in FIG. 7, is preferred. Contra-directional pumping allows an increase in amplifier gain/unit length with a decrease in pulse width in the absence of amplifier saturation, which is compatible with adiabacity. Clearly, the use of polarization-maintaining fibers is beneficial in such systems.

For applications in two-photon confocal microcopy, in the absence of damage and photo-bleaching constraints, it is also useful to resort to nearly linear amplifier systems to obtain a high value of M. Again, a contra-directionally pumped amplifier is most useful in this case, as it minimizes the nonlinearity of the amplifier, though a double-pass system is also possible. The expected performance of such a system can be estimated by comparing it to the system of the second embodiment. Assuming an optimally designed single-pass amplifier has to be some 30% longer than a double-pass amplifier, an optimum amplifier length is approximately L=3.4 m for a single-pass amplifier with an Er-doping level of about 750 ppm. Using a PPLN crystal with a length of about 3 mm, a pulse width of about 500 fsec is obtainable at the FDW. As the expected small-signal doubling efficiency of PPLN is about 95%/nJ for a bandwidth-limited sech²-shaped pulse, an overall doubling efficiency of about 40% can be achieved for such pulses. Thus, the linear configuration of the second embodiment can produce a power level of 23 mW at the FDW, a value of M 30% higher than in the second embodiment. However, this number does not account for pulse broadening effects in "almost-linear" amplifiers and a reduction in frequency conversion efficiency due to the residual small non-linearity of such systems. Nevertheless, if the use of longer pulses in practical two-photon confocal measurement systems is compatible with damage and photo-bleaching constraints, longer pulses may be preferred as they simplify the measurement system due to reduced dispersion problems inside the confocal microscope. Note that the critical element in such a system is a very efficient large-core amplifier and an oscillator, which does not produce ultra-short pulses, but rather pulses with widths of a few 100 fsec. Of course, an arbitrarily long pulse width can be selected from a wide-bandwidth oscillator by employing spectral filtering. However, this leads to power loss. As a better alternative, a seed pulse source which produces a pulse width >500 fsec can be used. Clearly, the use of polarization-maintaining fibers is beneficial in such systems.

Figure 8:
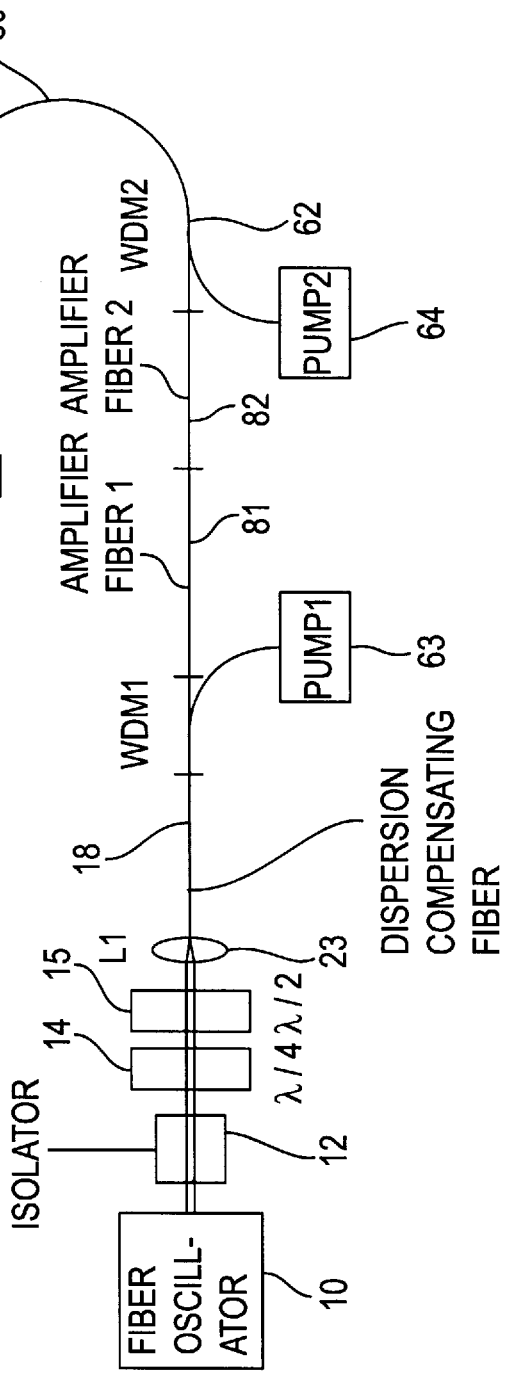
FIG. 8 illustrates an embodiment of the present invention wherein an amplifier fiber has two doping levels and an undoped fiber portion.

As discussed in the first embodiment, over-length amplifiers can be employed in a SRC to obtain a maximum doubling conversion efficiency. As there is a very little gain in the last section of an over-length amplifier, an undoped fiber 80 can be used in the last section of the SRC. Then, the length of the amplifier can be adjusted to obtain optimum signal gain and subsequently a large core-undoped fiber can be spliced to the amplifier fiber to obtain SRC action. Such an arrangement for a single-pass amplifier is shown in FIG. 8. A double-pass configuration (not shown) can also be implemented.

To maximize the overall efficiency of the whole system, amplifiers 81 and 82 with different doping levels (as also shown in FIG. 8) can be implemented. As the efficiency of typical fiber amplifiers increases with a decrease in doping level, in the early stages of amplification, low-doping levels for the amplifiers can be implemented; as the signal level is low in the first stages of amplification, the longer length of an amplifier with a low doping level can be tolerated.

Figure 9:
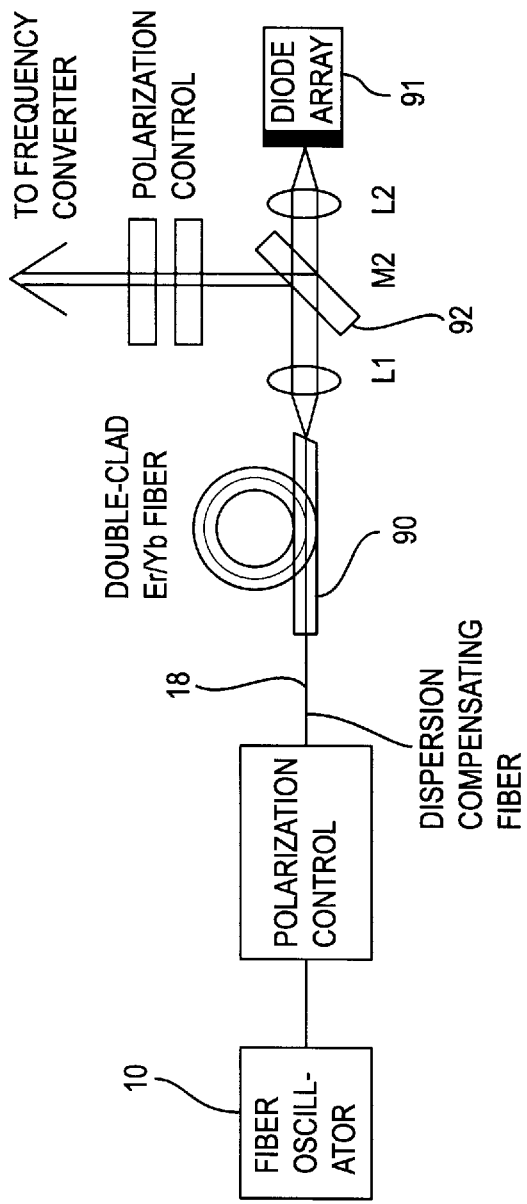
FIG. 9 illustrates an embodiment of the present invention in which a double-clad amplifier fiber is used.

To increase the available pump power to the SRC and to minimize the cost of the pump source, a double clad fiber 90 may be implemented, as shown in FIG. 9. Double-clad fibers allow pumping of the system with broad-stripe diode array lasers. For simplicity, only a single-pass is shown in FIG. 9. To enable cladding pumping Er-doped or Er/Yb-doped fibers may be employed. The extension to a double-pass is apparent from the previous discussion. In FIG. 9, the pump power is delivered via end-coupling to a diode array 91 through a dichroic mirror 92. However, multi-mode fiber couplers may be employed to perform this function. Alternatively, side-coupling of the pump power into the double-clad fiber may also be implemented.

Figure 10:
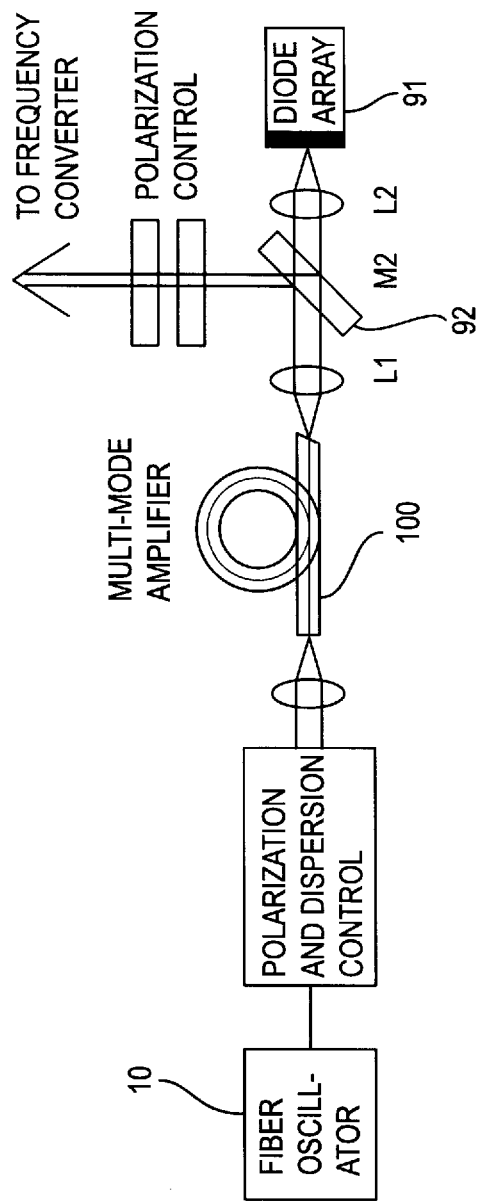
FIG. 10 illustrates an embodiment of the present invention in which a multi-mode amplifier fiber is used.

As the SRC is a highly nonlinear system, the use of amplifiers or undoped large-core fibers that are slightly multi-mode is also acceptable. With multi-mode fibers, the launch-conditions to the amplifier fiber are chosen to preferentially launch the fundamental mode, though, in general, higher-order modes will then also be excited. As long as the power in the fundamental mode is higher or comparable to the power in all the other modes, the SRC will first act on the fundamental mode. The Raman shifting of the fundamental mode can then be implemented in conjunction with the frequency doubler to obtain a nearly diffraction-limited output at the frequency-doubled wavelength. Again, double-clad fiber may also be implemented in such a system. A possible system implementation using a multi-mode fiber 100 is shown in FIG. 10. FIG. 10 shows a single-pass configuration, but a double-pass configuration is also possible. A bulk dichroic mirror 92 can be used for coupling of the pump light from a laser diode 91. Note, however, that multi-mode all-fiber couplers may also be used to perform this function. Equally, side-coupling of the pump light may also be implemented.

Figure 11:
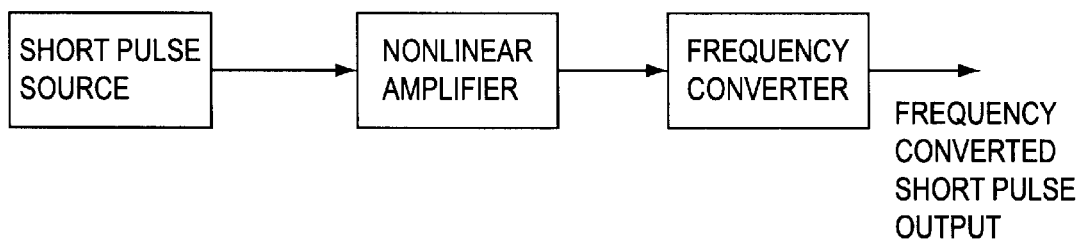
FIG. 11 illustrates a conceptual block diagram of the present invention.
Figure 12:
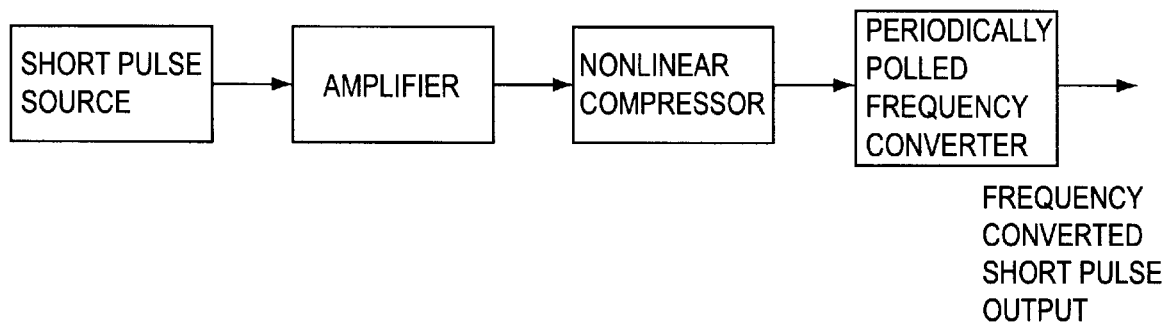
FIG. 12 illustrates a conceptual block diagram of the present invention wherein a linear amplifier and a non-linear compressor are used.

Further, as discussed above, the application of a frequency-conversion process is not limited to fiber amplifiers or nonlinear fiber compressors. In principle, any type of nonlinear amplifier at a SW with a nonlinear phase delay $\Phi_{nl}>5$ (as calculated previously), can be employed and frequency conversion can then produce a high-quality pulse at a frequency-converted wavelength. Such a system implementation is generally shown in FIG. 11. A system implementation with an amplifier, a nonlinear compressor and a PPLN frequency doubler is shown in FIG. 12. Of course, the fiber amplifier and compressor can be combined in a single optical component. Equally, a nonlinear amplifier and a linear or a nonlinear compressor could be employed.

As previously discussed, the use of PPLN is specifically advantageous for such systems, as PPLN is non-critically phase-matched and allows very efficient frequency-conversion. The selection of a PPLN crystal or a frequency converter with an acceptance bandwidth at the SW smaller than the bandwidth of the source at the SW is then beneficial for generating the highest possible quality pulses with the highest possible conversion efficiency.

Figure 13:
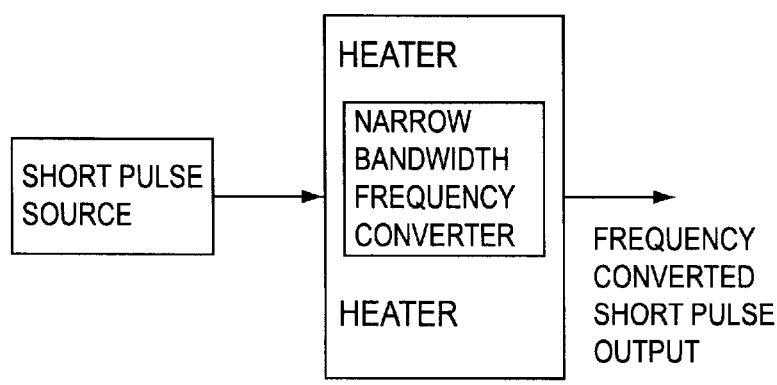
FIG. 13 illustrates another conceptual block diagram of the present invention.

Additionally, the principle of using a frequency converter with an acceptance bandwidth at the SW smaller than the bandwidth at SW can be applied for frequency-conversion of any source of short pulses. Such a system implementation is shown in FIG. 13. As previously discussed, the use of PPLN is specifically advantageous for such systems, as PPLN is non-critically phase-matched and allows a control of the acceptance bandwidth simply by controlling the length of the crystal. A certain tuning range is then achievable by selecting PPLN with different poling periods or by changing the temperature of the PPLN. Alternatively, any type of periodically poled nonlinear crystal could be used to perform the function of frequency conversion.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. An apparatus for generating high-power optical pulses, comprising:

an optical source which generates signal light;

a nonlinear fiber amplifier, having a nonlinear phase delay, which receives the signal light generated by said optical source, wherein pulse compression takes place in said nonlinear fiber amplifier; and a frequency converter which receives optical pulses output from said nonlinear fiber amplifier, said frequency converter providing the high-power optical pulses at an output thereof.

2. The apparatus according to claim 1, further comprising a polarization controller disposed between said optical source and said nonlinear fiber amplifier, said polarization controller adjusting a polarization state of the signal light received by said nonlinear fiber amplifier.

3. The apparatus according to claim 2, wherein said polarization controller comprises waveplates.

4. The apparatus according to claim 1, wherein said optical source comprises a fiber oscillator.

5. The apparatus according to claim 1, wherein said nonlinear fiber amplifier is rare earth doped.

6. The apparatus according to claim 5, wherein said nonlinear fiber amplifier is doped with one of: $Er^{3+}$, $ErYb^+$, Pr Tm and Ho.

7. The apparatus according to claim 1, wherein the nonlinear fiber amplifier has a numerical aperture (NA) less than 0.15.

8. The apparatus according to claim 1, wherein the nonlinear fiber amplifier has a core area greater than 50 $\mu m^2$.

9. The apparatus according to claim 1, wherein said nonlinear fiber amplifier comprises a soliton-Raman compressor (SRC).

10. An apparatus for generating high-power optical pulses, comprising:
an optical source which generates signal light;
a nonlinear fiber amplifier, having a nonlinear phase delay, which receives the signal light generated by said optical source;
a fiber pulse compressor disposed to compress the optical pulses output from said nonlinear fiber amplifier;
wherein the refractive index distribution of said pulse compressor is approximately invariant along the fiber length; and
a frequency converter which receives optical pulses output from said nonlinear fiber amplifier, said frequency converter providing the high-power optical pulses at an output thereof.

11. The apparatus according to claim 10, wherein said fiber pulse compressor is a soliton-Raman compressor (SRC).

12. The apparatus according to claim 1, wherein said frequency converter comprises a periodically poled crystal.

13. The apparatus according to claim 12, wherein said periodically poled crystal comprises a periodically poled lithium-niobate crystal (PPLN).

14. The apparatus according to claim 1, further comprising an isolator disposed between said optical source and said nonlinear fiber amplifier.

15. The apparatus according to claim 1, further comprising a first pump coupled to said nonlinear fiber amplifier through a first wavelength-division multiplexing coupler, said first pump providing pump light to said nonlinear fiber amplifier.

16. The apparatus according to claim 15, further comprising a second pump coupled to said nonlinear fiber amplifier through a second wavelength-division multiplexing coupler, said second pump providing pump light to said nonlinear fiber amplifier.

17. The apparatus according to claim 1, wherein said nonlinear fiber amplifier is a polarization maintaining fiber.

18. The apparatus according to claim 1, further comprising a first polarization controller disposed between said optical source and said nonlinear fiber amplifier and a second polarization controller at an output end of said nonlinear fiber amplifier.

19. The apparatus according to claim 1, wherein said nonlinear fiber amplifier is a contradirectionally pumped amplifier and wherein the core diameter and the group-velocity are approximately constant along the amplifier length.

20. The apparatus according to claim 1, wherein said nonlinear fiber amplifier is an over-length amplifier and comprises an undoped fiber at an output end thereof.

21. The apparatus according to claim 1, wherein said nonlinear fiber amplifier comprises a first amplifier fiber having a first doping and a second amplifying fiber having a second doping.

22. The apparatus according to claim 1, wherein said nonlinear fiber amplifier comprises a double-clad fiber pumped with a diode array laser.

23. An apparatus for generating high-power optical pulses, comprising:
an optical source which generates signal light;
a nonlinear fiber amplifier, having a nonlinear phase delay, which receives the signal light generated by said optical source,
wherein the amplifier fiber is a double-clad fiber, and
wherein pump light and the signal light are launched into a core of the amplifier fiber; and
a frequency converter which receives optical pulses output from said nonlinear fiber amplifier, said frequency converter providing the high-power optical pulses at an output thereof.

24. An apparatus for generating high-power optical pulses, comprising:
an optical source which generates signal light;
a nonlinear fiber amplifier, having a nonlinear phase delay, which receives the signal light generated by said optical source,
wherein said nonlinear amplifier comprises a multi-mode amplifier fiber, and
wherein the signal light is predominantly launched into the fundamental mode of said multi-mode amplifier fiber; and
a frequency converter which receives optical pulses output from said nonlinear fiber amplifier, said frequency converter providing the high-power optical pulses at an output thereof.

25. The apparatus according to claim 1, wherein said nonlinear fiber amplifier comprises a dispersion compensating fiber.

26. The apparatus according to claim 1, further comprising a dispersion compensating fiber.

27. The apparatus according to claim 1, wherein a spectral acceptance bandwidth of said frequency converter is smaller than an extent of the spectrum of the optical pulses output from said nonlinear fiber amplifier, and wherein said frequency converter converts energy from a portion of the spectrum of the optical pulses output from said nonlinear fiber amplifier that is greater than the spectral acceptance bandwidth into the spectral acceptance bandwidth.

28. An apparatus for generating high-power optical pulses, comprising:
an optical source which generates high power optical pulses;
a nonlinear fiber amplifier, having a nonlinear phase delay, which receives the high power pulses generated by said optical source; and
a frequency converter which receives optical pulses output from said nonlinear fiber amplifier, and which provides high-power optical pulses at a frequency-converted wavelength, wherein a spectral acceptance bandwidth of said frequency converter is smaller than an extent of the spectrum of the optical pulses from said optical source, and wherein said frequency converter converts energy from a portion of the spectrum of the optical pulses, from said optical source that is greater than the spectral acceptance bandwidth of said frequency converter, into the spectral acceptance bandwidth of said frequency converter.

29. The apparatus according to claim 28, wherein said frequency converter is periodically poled.

30. An apparatus for generating high-power optical pulses, comprising:

an optical source which generates signal light;

a fiber amplifier which receives the signal light generated by said optical source;

a nonlinear fiber compressor which receives optical pulses produced by said amplifier, wherein the nonlinear fiber compressor has a refractive index distribution which is approximately invariant along the fiber length; and a periodically poled frequency converter which receives optical pulses compressed by said nonlinear fiber compressor and which produces the high-power optical pulses at a frequency-converted wavelength.

31. An apparatus for generating high-power optical pulses, comprising:

means for generating signal light;

optical fiber means for nonlinearly amplifying the signal light;

optical fiber means for pulse compressing the signal light, wherein the optical fiber means has a refractive index distribution which is approximately invariant along the fiber length; and means for frequency converting optical pulses produced by said means for nonlinearly amplifying and compressing, said means for frequency converting producing the high-power optical pulses at an output thereof.

32. The apparatus according to claim 31, further comprising means for controlling a polarization state of the signal light.

33. The apparatus according to claim 31, further comprising means for pumping pump light into said means for nonlinearly amplifying.

34. A method for generating high-power optical pulses, comprising the steps of:

generating a signal light;

simultaneously nonlinearly amplifying and pulse compressing the signal light to produce amplified and pulse-compressed optical pulses; and frequency converting the amplified optical pulses to produce the high-power optical pulses at a different wavelength from the signal light.

35. The method according to claim 34, further comprising the step of:

controlling a polarization state of the signal light.

36. The method according to claim 34, wherein a double-clad fiber performs nonlinear amplification.

37. The method according to claim 36, further comprising the step of launching pump light and the signal light directly into an inner core of the double-clad fiber.

38. A method for generating high-power optical pulses, comprising the steps of:

generating a signal light, nonlinearly amplifying the signal light to produce amplified optical pulses, wherein a double-clad fiber, pumped by an optical pumping means performs nonlinear amplification, further comprising the step of launching pump light and signal light directly into the inner core of said double-clad fiber, and frequency converting the amplified optical pulses to produce the high-power optical pulses at a different wavelength from the signal light.

39. An apparatus for generating optical pulses, comprising:

a fiber laser source for generating signal light;

a multi-mode fiber amplifier for amplifying the signal light;

means for preferentially launching a fundamental mode of said multi-mode amplifier, said multi-mode amplifier Raman-shifting said fundamental mode; and frequency conversion means for generating amplified output light at a doubled frequency.

40. An apparatus for generating optical pulses, comprising:

a pulse laser source for generating signal light;

a multi-mode fiber amplifier for amplifying the signal light;

means for preferentially launching a fundamental mode of said multi-mode amplifier, said multi-mode amplifier Raman-shifting said fundamental mode; and frequency conversion means for generating amplified output light.

41. An apparatus for generating optical pulses, comprising:

a pulse laser source for generating signal light;

a multi-mode fiber amplifier for amplifying the signal light predominately in a fundamental mode thereof;

a means for Raman-shifting said fundamental mode; and frequency conversion means for frequency-converting at least a Raman-shifted fundamental mode output of said multi-mode fiber amplifier.

42. An apparatus for generating optical pulses, comprising:

an optical source for generating signal light in the form of short optical pulses, and having an emission bandwidth;

a nonlinear amplifier for amplifying the signal light; and a nonlinear frequency converting element having an acceptance bandwidth which is smaller than said emission bandwidth, and being capable of frequency-converting signal light within a bandwidth larger than said acceptance bandwidth.

43. An apparatus for generating high-power optical pulses, comprising:

a fiber laser source for generating signal light in the form of femtosecond regime optical pulses, and having a broad-band emission bandwidth;

an amplifier for amplifying the signal light; and a nonlinear crystal having an acceptance bandwidth which is smaller than said broad-band emission bandwidth, and being capable of frequency-converting input light within a bandwidth larger than said acceptance bandwidth, for generating narrow-band frequency-converted light from broad-band signal light.

44. An apparatus for generating high-power optical pulses, comprising:
   a fiber laser source for generating signal light in the form of broad-band femtosecond regime optical pulses;
   an amplifier for amplifying the signal light; and
   a nonlinear crystal for frequency converting said broad-band signal light into narrow-band frequency-converted light.

45. The apparatus as claimed in claim 44, wherein said nonlinear crystal has an acceptance bandwidth which is smaller than the broad-band emission bandwidth of said signal light, and frequency-converts input light within a bandwidth larger than said acceptance bandwidth.

46. An apparatus for generating optical pulses, comprising:
   an optical source for generating signal light in the form of short optical pulses, and having an emission bandwidth;
   an amplifier for amplifying the signal light; and
   a nonlinear element having a tunable acceptance bandwidth which is smaller than said emission bandwidth, and being capable of frequency-converting said signal light within a bandwidth larger than said acceptance bandwidth.

47. An apparatus as claimed in claim 46, wherein the acceptance bandwidth of said nonlinear element can be tuned within said emission bandwidth without significant decrease in conversion efficiency.

48. An apparatus for generating optical pulses, comprising:
   an optical source for generating signal light in the form of short optical pulses, and having an emission bandwidth;
   a nonlinear frequency converting element having an acceptance bandwidth which is smaller than said emission bandwidth, and being capable of frequency-converting signal light within a bandwidth larger than said acceptance bandwidth.

49. An apparatus for generating high-power optical pulses for use in two-photon confocal microscopy, comprising:
   an optical source which generates signal light;
   a nonlinear fiber amplifier, having a nonlinear phase delay, which receives the signal light generated by said optical source,
   wherein pulse compression takes place in said nonlinear fiber amplifier, and said nonlinear fiber amplifier is a polarization maintaining fiber; and
   a frequency converter which receives optical pulses output from said nonlinear fiber amplifier, said frequency converter providing the high-power optical pulses at an output thereof.

50. An apparatus for generating high-power optical pulses for use in two-photon confocal microscopy, comprising:
   an optical source which generates signal light;
   a nonlinear fiber amplifier, having a nonlinear phase delay, which receives the signal light generated by said optical source,
   wherein pulse compression takes place in said nonlinear fiber amplifier, and said nonlinear fiber amplifier is a contradirectionally pumped amplifier, and
   wherein the core diameter and the group-velocity are approximately constant along the amplifier length; and
   a frequency converter which receives optical pulses output from said nonlinear fiber amplifier, said frequency converter providing the high-power optical pulses at an output thereof.

51. An apparatus for generating ultra-short, high-power optical pulses, comprising:
   an optical source which generates signal light;
   a nonlinear fiber amplifier, having a nonlinear phase delay, which receives the signal light generated by said optical source,
   wherein pulse compression takes place in said nonlinear fiber amplifier; and
   a frequency converter which receives optical pulses output from said nonlinear fiber amplifier, said frequency converter providing the high-power optical pulses in Thz range at an output thereof for use in injection seeding of high-power amplifiers.

* * * * *